United States Patent
Bhogal et al.

(10) Patent No.: US 8,205,078 B2
(45) Date of Patent: *Jun. 19, 2012

(54) HANDLING FILES CONTAINING CONFIDENTIAL OR SENSITIVE INFORMATION

(75) Inventors: Kulvir Singh Bhogal, Fort Worth, TX (US); Hung The Dinh, Round Rock, TX (US); Teng Hu, Austin, TX (US); Nizamudeen Ishmael, Jr., Austin, TX (US); Mandeep Singh Sidhu, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 12/389,495

(22) Filed: Feb. 20, 2009

(65) Prior Publication Data

US 2009/0158391 A1  Jun. 18, 2009

Related U.S. Application Data

(63) Continuation of application No. 10/185,693, filed on Jun. 27, 2002, now Pat. No. 7,519,984.

(51) Int. Cl.
*H04L 29/06* (2006.01)
(52) U.S. Cl. ........ 713/165; 713/193; 726/2; 726/5; 726/18; 726/19; 726/27; 709/219
(58) Field of Classification Search .......... 726/1–2, 726/16, 30, 5, 18, 19, 27; 713/193, 165; 709/219; 707/9
See application file for complete search history.

(56) References Cited

U.S. PATENT DOCUMENTS

| | | | |
|---|---|---|---|
| 5,367,671 A | 11/1994 | Feigenbaum et al. | |
| 5,615,261 A | 3/1997 | Grube et al. | |
| 5,680,452 A | 10/1997 | Shanton | |
| 5,796,825 A | 8/1998 | McDonnal et al. | |
| 5,813,016 A * | 9/1998 | Sumimoto | 1/1 |
| 5,903,723 A | 5/1999 | Beck et al. | |
| 6,058,378 A | 5/2000 | Clark et al. | |
| 6,202,056 B1 | 3/2001 | Nuttall | |
| 6,209,030 B1 | 3/2001 | Ohashi | |
| 6,289,462 B1 | 9/2001 | McNabb et al. | |
| 6,292,900 B1 | 9/2001 | Ngo et al. | |
| 6,496,872 B1 | 12/2002 | Katz et al. | |
| 6,718,361 B1 | 4/2004 | Basani et al. | |
| 6,760,752 B1 | 7/2004 | Liu et al. | |
| 7,024,556 B1 | 4/2006 | Hadjinikitas et al. | |
| 7,047,407 B2 | 5/2006 | Itoh et al. | |
| 7,058,667 B2 | 6/2006 | Goldick | |
| 7,272,857 B1 * | 9/2007 | Everhart | 726/26 |

(Continued)

OTHER PUBLICATIONS

USPTO Notice of Allowance for U.S. Appl. No. 10/185,693, dated Dec. 2, 2008, (7 pages).

(Continued)

*Primary Examiner* — Thanhnga B Truong
(74) *Attorney, Agent, or Firm* — Yee & Associates, P.C.; Steven L. Bennett

(57) ABSTRACT

A method, apparatus, and computer instructions for managing files in a data processing system. An attribute for a file is specified as having a special designation. The file with the attribute having the special designation is processed, by the operating system, in a different manner from other files when performing operations, such as, for example, copying the file to a removable media, printing the file, or sending the file over a network.

15 Claims, 3 Drawing Sheets

U.S. PATENT DOCUMENTS

| | | |
|---|---|---|
| 7,519,984 B2 | 4/2009 | Bhogal et al. |
| 2002/0199103 A1 | 12/2002 | Dube |
| 2003/0105849 A1 | 6/2003 | Iwamoto et al. |
| 2003/0120601 A1 | 6/2003 | Ouye et al. |

OTHER PUBLICATIONS

USPTO Office Action for U.S. Appl. No. 10/185,693, dated May 30, 2008, (10 pages).

USPTO Final Office Action for U.S. Appl. No. 10/185,693, dated Dec. 31, 2007, (20 pages).

USPTO Office Action for U.S. Appl. No. 10/185,693, dated Jul. 17, 2007, (11 pages).

USPTO Final Office Action for U.S. Appl. No. 10/185,693, dated Jan. 29, 2007, (11 pages).

USPTO Office Action for U.S. Appl. No. 10/185,693, dated Aug. 4, 2006, (9 pages).

\* cited by examiner

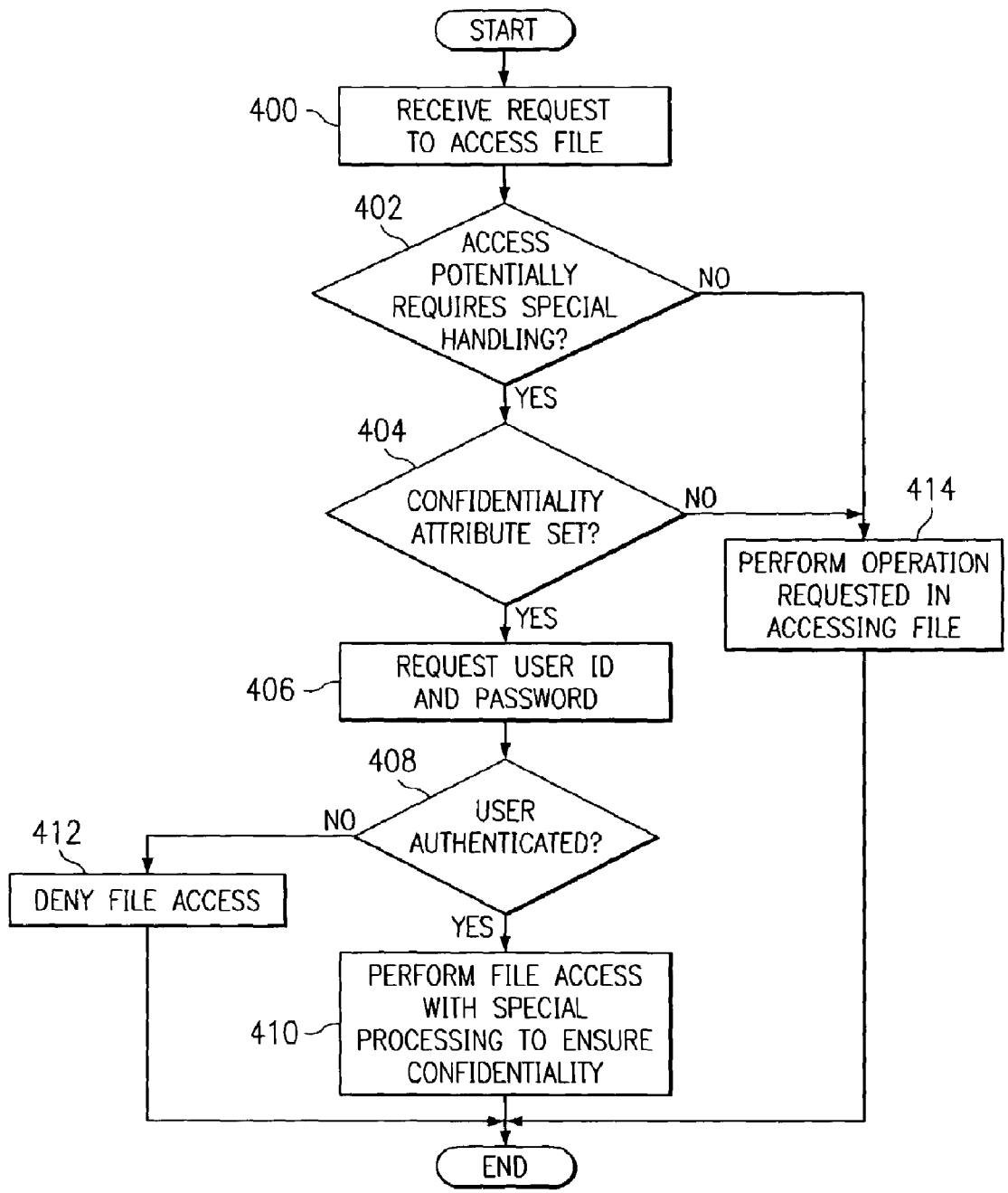

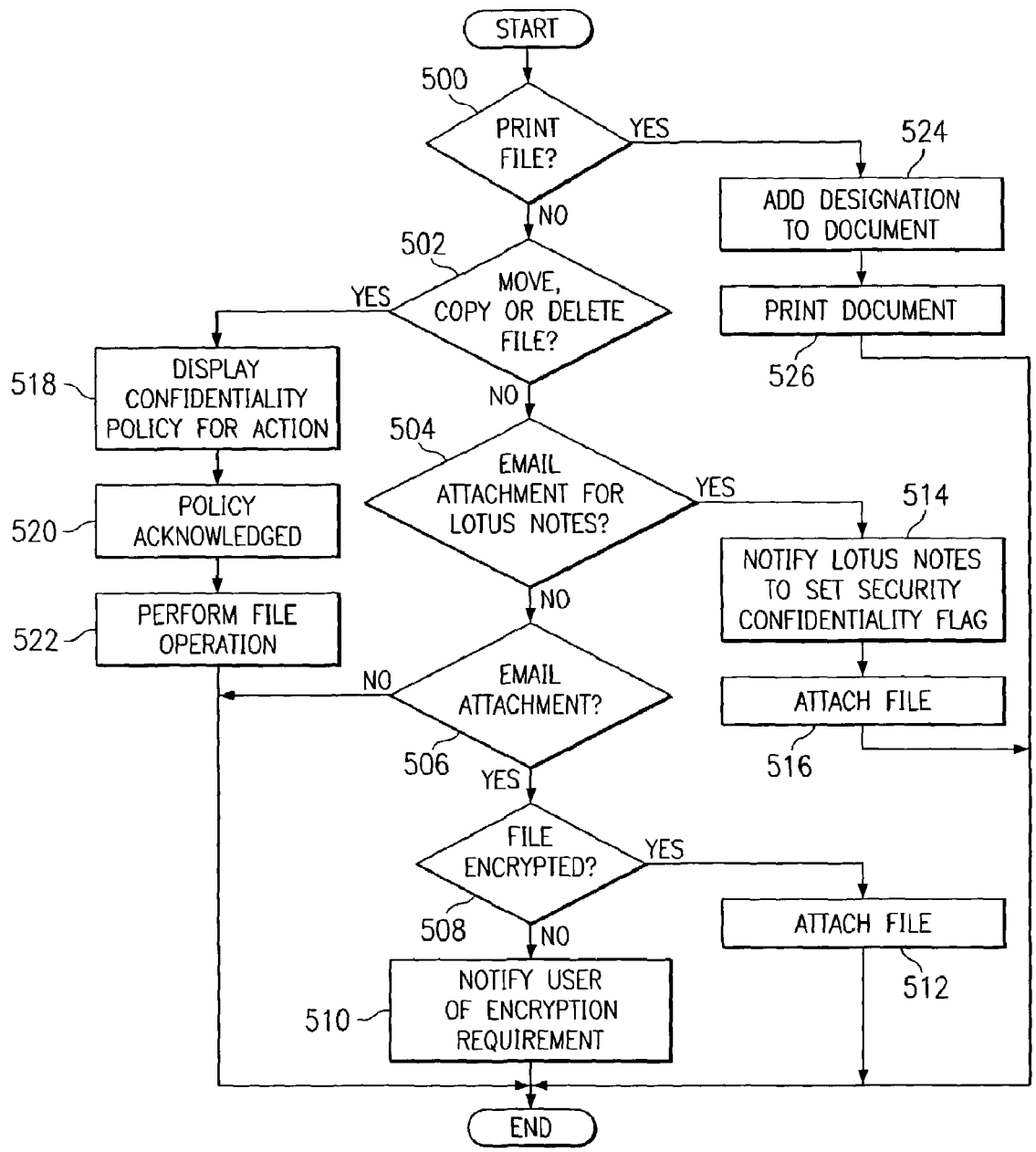

HANDLING FILES CONTAINING CONFIDENTIAL OR SENSITIVE INFORMATION

This application is a continuation of application Ser. No. 10/185,693, filed Jun. 27, 2002, status allowed.

BACKGROUND OF THE INVENTION

1. Technical Field

The present invention relates generally to an improved data processing system, and in particular, to a method and apparatus for managing data. Still more particularly, the present invention provides a method and apparatus for handling files in a data processing system in which the files contain confidential information.

2. Description of Related Art

Computers and networks have become common place in society. Networks are used within companies for various purposes, such as sending messages to employees and coworkers, storing information, and providing access to information company wide. Computers and networks are used in schools and universities to distribute assignments, post lecture notes, and for research. Further many of these networks and computers are connected to the Internet. The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

With the spread of networks and connectivity to the Internet, proper handling of confidential information has become increasingly important to prevent accidental sending of confidential information to the wrong recipient. Companies have policies in place as to designations and handling of confidential information. For example, encryption of all files containing confidential information may be required for transfer of files outside of a company's network or outside of selected computers. These polices are contained in manuals and may be accessible over a company intranet. Often times, however, a user may not remember or may not have been read the polices on how files are to be handled. Other times, changes in a policy may not have read by everyone even though the changes may be posted or sent in emails. These changes are not known until the posted memoranda or emails are actually read. Even when the policies are known, the individual would have to remember or know how to identify confidential information. Thus, confidential information may be inadvertently mishandled by lack of knowledge of the policies or by confidential information remaining unidentified because a user did not see or look for a confidential designation.

Therefore, the present invention provides an improved method, apparatus, and computer instructions for handling confidential or sensitive information.

SUMMARY OF THE INVENTION

The present invention provides a method, apparatus, and computer instructions for managing files in a data processing system. An attribute for a file is specified as having a special designation. The file with the attribute having the special designation is processed, by the operating system, in a different manner from other files when performing operations, such as, for example, copying the file to a removable media, printing the file, or sending the file over a network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a process used for handling files in accordance with a preferred embodiment of the present invention; and FIG. 5 is a flowchart of a process used for special processing of a file in accordance with a preferred embodiment of the present invention.

DETAILED DESCRIPTION OF THE PREFERRED EMBODIMENT

Figure 1:
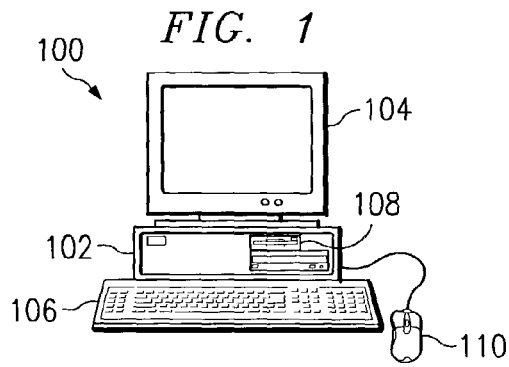
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
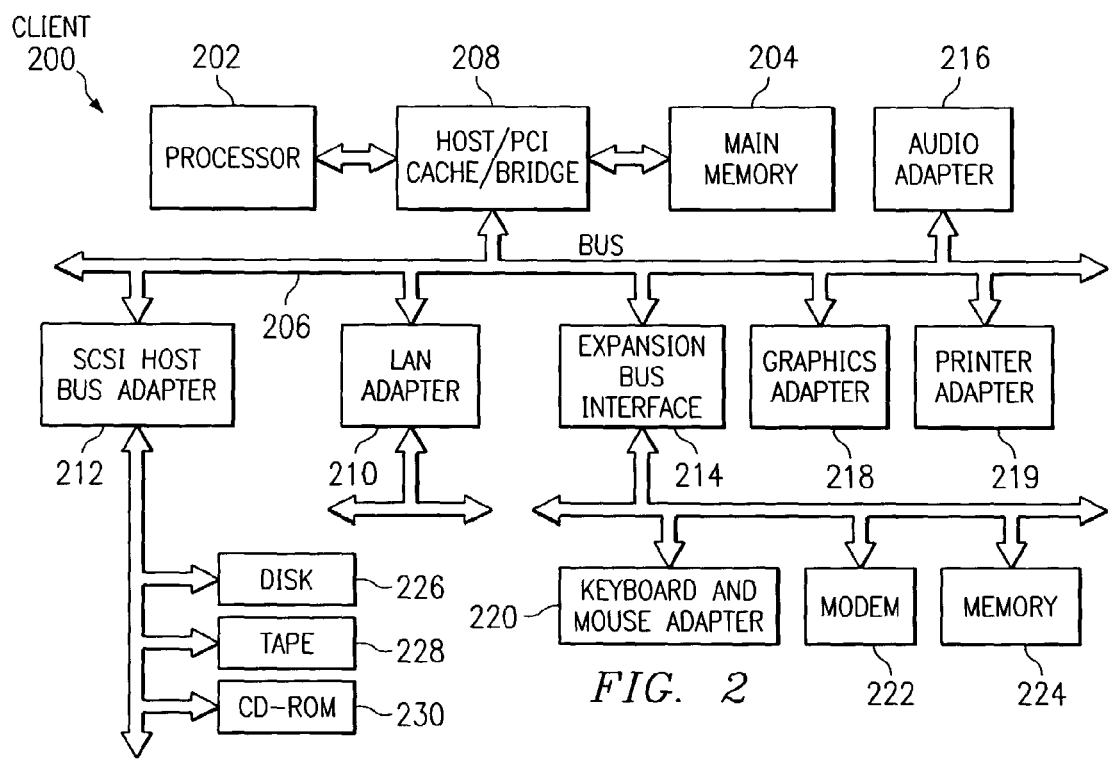
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (ACP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and printer adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM drive 230. Depending on the particular implementation, hard disk drive 226 may be a removable hard disk drive. Additionally, CD-ROM drive 230 also may write data in addition to reading data on rewritable CDs. In that case, the computer, to be properly called a client computer, includes some type of network communication interface, such as LAN adapter 210, modem 222, or the like. Through LAN adapter 210, data processing system 200 may be connected to and in communication with a network, such as a local area network, a wide area network (WAN), or the Internet. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide nonvolatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Figure 3:
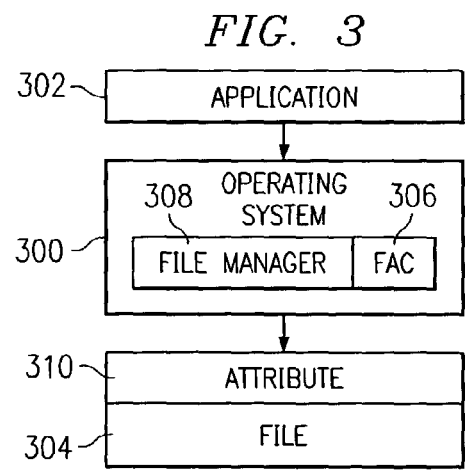
FIG. 3 is a diagram illustrating components used in handling files containing confidential information in accordance with a preferred embodiment of the present invention.

With reference now to FIG. 3, a diagram illustrating components used in handling files containing confidential information is depicted in accordance with a preferred embodiment of the present invention. In this example, a user may access files handled by operating system 300 through an application, such as application 302. In this example, access to file 304 may occur through requests made by application 302. For example, if application 302 is an email program, a user may request attachment of file 304 to an email that is to be sent to a recipient through an output device, such as LAN adapter 210 or modem 222, in FIG. 2. Alternatively, a user may copy file 304 to a removable media, such as those handled by tape drive 228 or CD-ROM drive 230 in FIG. 2. Additionally, application 302 may generate a hard copy form of the data in file 304 by sending the file to a printer through printer adapter 219 in FIG. 2. All file access to files, such as file 304 are handled through file access control (FAC) module 306 within file manager 308 in operating system 300.

In these examples, the mechanism of the present invention is embodied within file access control module 306 to provide for special handling of files that have been designated as confidential or containing information that is to be handled in a manner different from other files. This designation is implemented, in these examples through attribute 310, which is also referred to as a confidentiality attribute. Whenever a file access occurs, file access control module 306 checks to see whether attribute 310 is set to true. If this confidentiality attribute is set to true, file 304 is handled differently from other files without this attribute being set. The particular processing or handling that occurs is implementation dependent and may be based on policies for the particular implementation. Further, this handling may occur only for specific types of file access, such as, for example, printing operations, copying of files to removable media, and transfer or sending of files outside of the data processing system or network. This special handling may include, for example, presenting or displaying handling instructions to the user, adding a watermark to a printed form of the file, or requiring encryption of the file prior to copying or transferring the file. The mechanism of the present invention may be applied to other types of operations other than those described above. For example, file operations, such as read, delete, write, and move also may be associated with specific handling that differs from normal handling of files when attribute 310 is set to true.

Turning now to FIG. 4, a flowchart of a process used for handling files is depicted in accordance with a preferred embodiment of the present invention. The process illustrated in FIG. 4 may be implemented in a file access control module, such as file access control module 306 in FIG. 3.

The process begins by receiving a request to access a file (step 400). This request may be received from an application, such as application 302 in FIG. 3. First, a determination is made as to whether the requested file access potentially requires special handling (step 402). Depending on the particular implementation, only selected types of file access may require special handling of files having a confidentiality attribute set to true. For example, moving of a file through detaching the file from an email, attaching a file to an email message, or copying a file to a removable media may require special handling if the confidentiality attribute is set to true. Other types of file access, such as reading or deleting a file may not require special handling regardless of how the attribute is set.

If the requested file access potentially requires special handling, a determination is made as to whether the confidentiality attribute is set to true (step 404). If the confidentiality attribute is set to true, the user ID and password are requested (step 406). Step 406 is an optional step providing for additional handling that may be used to ensure that the user requesting the access is entitled or authorized to perform the particular file operation on the file. Next, a determination is made as to whether the user is authenticated (step 408). If the user is authenticated, the file access is performed with special processing to ensure confidentiality (step 410) with the process terminating thereafter. This special handling may differ depending on the particular type of file access or type of file that is being accessed. Examples of this special type of handling are described in more detail in FIG. 5 below.

With reference again to step 408, if the user is not authenticated, file access is denied (step 412) and the process terminates thereafter. In addition, details of the failed attempt may be stored in a log by the file access control module. With reference again to step 404, if the confidentiality attribute is not set to true, the operation requested in accessing the file is performed (step 414) with the process terminating thereafter. The access is performed in step 414 without any additional or special handling because the file is not a file requiring this type of processing.

Referring again to step 402, if the requested file access does not require special handling, the process proceeds to step 414 as described above.

With reference now to FIG. 5, a flowchart of a process used for special processing of a file is depicted in accordance with a preferred embodiment of the present invention. The process illustrated in FIG. 5 may be implemented in a file access control module, such as file access control module 306 in FIG. 3. In particular, this process is a more detailed description of step 410 in FIG. 4.

The process begins by making a determination as to whether a request has been made to print a file (step 500). If there has not been a request made to print the file, a determination is made as to whether a request has been made to move, copy, or delete the file (step 502). If there has not been a request made to move, copy, or delete the file, a determination is made as to whether the file is an email attachment for Lotus Notes (step 504). Lotus Notes is a program available from International Business Machines Corporation and is used to send messages as well as provide calendaring and other organizational functions. If the file is not an email attachment for Lotus Notes, a determination is made as to whether the file is an email attachment (step 506). If the file is not an email attachment, the process terminates.

With reference again to step 506, if the file is an email attachment, a determination is made as to whether the file is encrypted (step 508). If the file is not encrypted, the user is notified of the encryption requirement (step 510) and the process terminates thereafter. Optionally, step 510 also may allow the user to encrypt the file at that time and then proceed with the operation. If the file is encrypted, the file is attached to the email message (step 512) and the process terminates thereafter.

With reference again to step 504, if the file is an email attachment for Lotus Notes, Lotus Notes is notified to set security confidentiality flag (step 514). The setting of this confidentiality flag in Lotus Notes causes automatic encryption of any attached files. Further, the user may optionally set other flags in Lotus Notes, such as providing for a return receipt, preventing the receiver from copying received email, preventing the receiver from forwarding received email, and preventing printing of received email and attachments. The file is attached to the email message (step 516) and the process terminates thereafter.

Referring again to step 502, if there has been a request made to move, copy, or delete the file, the confidentiality policy for the action is displayed (step 518). The confidentiality policy may be, for example, "be careful that the disk does not fall into the wrong hands". This type of display may be presented if the file is being moved or copied to a removable media, such as a rewritable CD or floppy disk. The policy is acknowledged (step 520), the file operation is performed (step 522), and the process terminates thereafter. Acknowledgment of the policy in step 520 may occur by the user selecting a control, such as a button labeled as "read and acknowledged" or as "okay". With reference again to step 500, if there has been a request made to print the file, a designation, such as, for example, a watermark, is added to the document (step 524). This designation may be one that reads as follows: "company confidential" or "top secret". The document is then printed with the designation (step 526) and the process terminates thereafter. Of course, the particular examples depicted here in FIG. 5 are provided for purposes of illustration and are not meant as limitations as to the types of operations that may require special handling or as to the particular types of processing that occurs with files having a confidentiality attribute being set to true.

Thus, the present invention provides an improved method, apparatus, and computer instructions for handling confidential or sensitive information. This mechanism includes marking a file as confidential through an attribute setting. When this attribute is detected as being set to true, the file is handled differently from other files without this attribute being set to true. The processes of the present invention are implemented directly into the operating system in these examples because all file access requests must pass through the operating system. In this manner, bypassing the features of the present invention may be avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. In the depicted examples, the files are checked to determine whether they are encrypted for any attachment of a file to an email message. The mechanism of the present invention also may be applied to particular destinations based on the email address or as to whether the email is being sent outside of a particular LAN or WAN. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for managing files, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to determine whether a confidentiality attribute has been set for a file and a type of file access being requested in response to receiving a file access request from a user application; determine whether the type of file access being requested is one of a plurality of pre-specified access types in response to determining that the confidentiality attribute is set; and process the file access request using pre-specified confidentiality protection procedures associated with one of the plurality of pre-specified access types in response to determining that the type of file access being requested is the one of the plurality of pre-specified access types.

2. A data processing system for managing files, the data processing system comprising a processor capable of executing:
    determining means, responsive to receiving a request to access a file, for determining whether a confidentiality attribute has been set for the file and a type of file access being requested;
    processing means, responsive to determining that the confidentiality attribute is set, for determining whether the type of file access being requested is one of a plurality of pre-specified access types; and
    processing means, responsive to determining that the type of file access being requested is one of the plurality of pre-specified access types, for processing the request to access the file using pre-specified confidentiality protection procedures associated with the one of the plurality of pre-specified access types.

3. The data processing system of claim 2, wherein the processing means comprises:
    displaying means for displaying a confidentiality designation.

4. The data processing system of claim 2, wherein the processing means comprises:
    ensuring means for ensuring the file is encrypted before allowing the file to be sent of the network.

5. The data processing system of claim 2, wherein the processing means comprises:
    including means for automatically including a confidentiality notice to an email to which the file is attached when sending the file over the network.

6. The data processing system of claim 2, wherein the processing means comprises:
    adding means for adding a designation to pages printed when printing the file.

7. The data processing system of claim 2, wherein the processing means comprises:
    displaying means for displaying a statement regarding handling of the file performing one of detaching the file from an email message, copying the file, deleting the file, and moving the file.

8. The data processing system of claim 2, wherein the processing means is a first processing means and wherein the processor is further capable of executing:
    second processing means, responsive to determining that the confidentiality attribute is set, for processing the request to access the file when the request is to send the file to an output device.

9. The data processing system of claim 8, wherein the output device is a network adapter.

10. The data processing system of claim 8, wherein the output device is a printer.

11. The data processing system of claim 8, wherein the processing means includes:
    presenting means for presenting a warning in which the warning indicates confidential data is present in the file when the request is to send the file to an output device.

12. The data processing system of claim 8, wherein the output device is a network adapter and wherein the processing means includes:
    means for determining whether the file is encrypted when sending the file onto a network through the network adapter; and
    preventing means for preventing sending of the file onto the network if the file is unencrypted.

13. The data processing system of claim 2, wherein the determining means is a first determining means and wherein the processing means further includes:
    second determining means for determining whether the file is encrypted when the request is to attach the file to an email message; and
    preventing means for preventing attachment of the file if the file is unencrypted.

14. The data processing system of claim 2, wherein the determining means and the processing means are located in an operating system executing on the processor.

15. A non-transitory computer readable media having a computer program product for managing files, the computer program product comprising:
    first instructions, responsive to receiving a request to access a file, for determining whether a confidentiality attribute has been set for the file and a type of file access being requested;
    second instructions, responsive to determining that the confidentiality attribute is set, for determining whether the type of file access being requested is one of a plurality of pre-specified access types; and
    third instructions, responsive to determining that the type of file access being requested is one of the plurality of pre-specified access types, for processing the request to access the file using pre-specified confidentiality protection procedures associated with the one of the plurality of pre-specified access types.

* * * * *